Sept. 18, 1951　　　S. F. WINCHELL　　　2,568,675
MACHINE TOOL

Filed Dec. 31, 1946　　　　　　　　　5 Sheets-Sheet 1

INVENTOR.
STERLING F. WINCHELL
BY Kwis, Hudson,
Boughton & Williams
ATTORNEYS

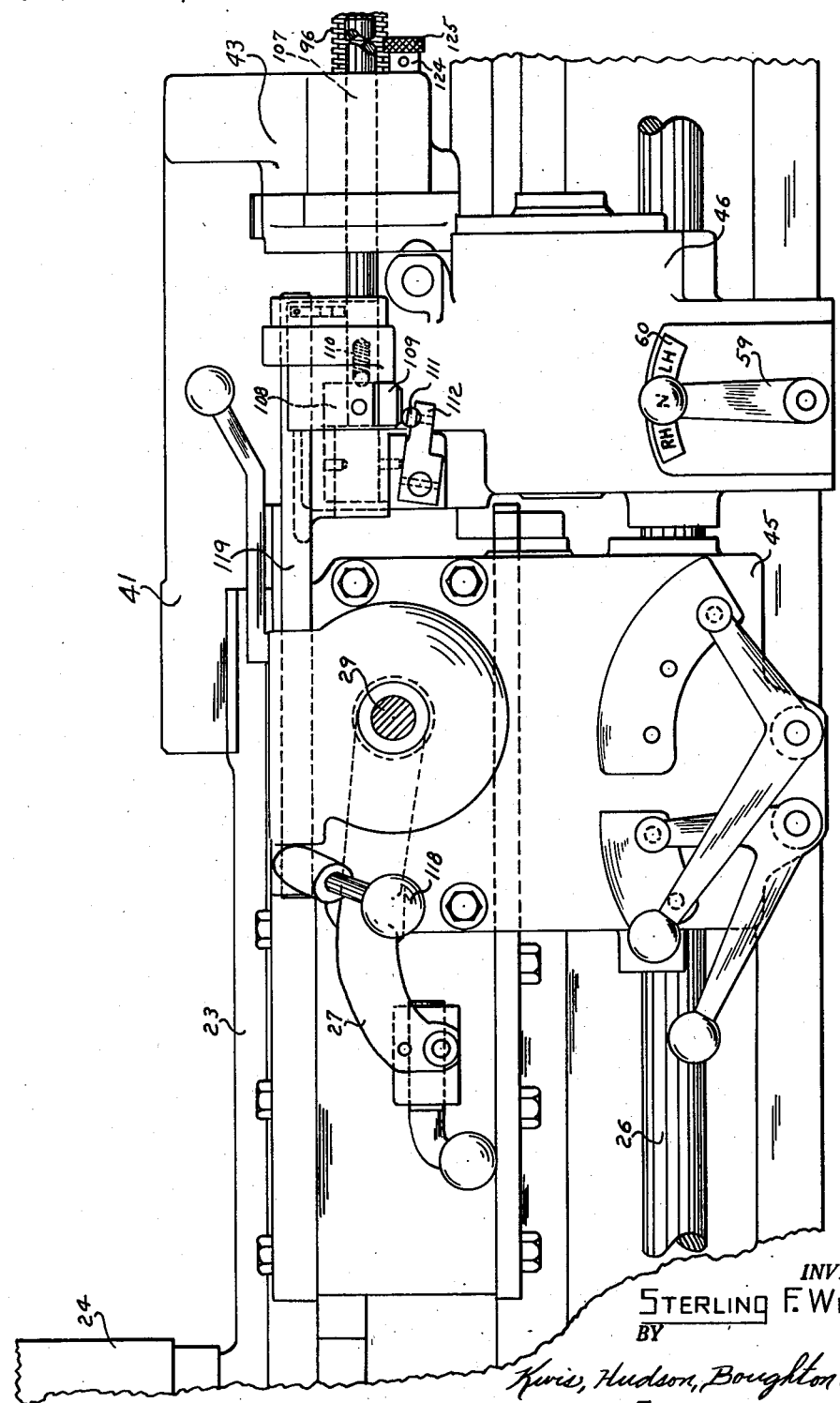

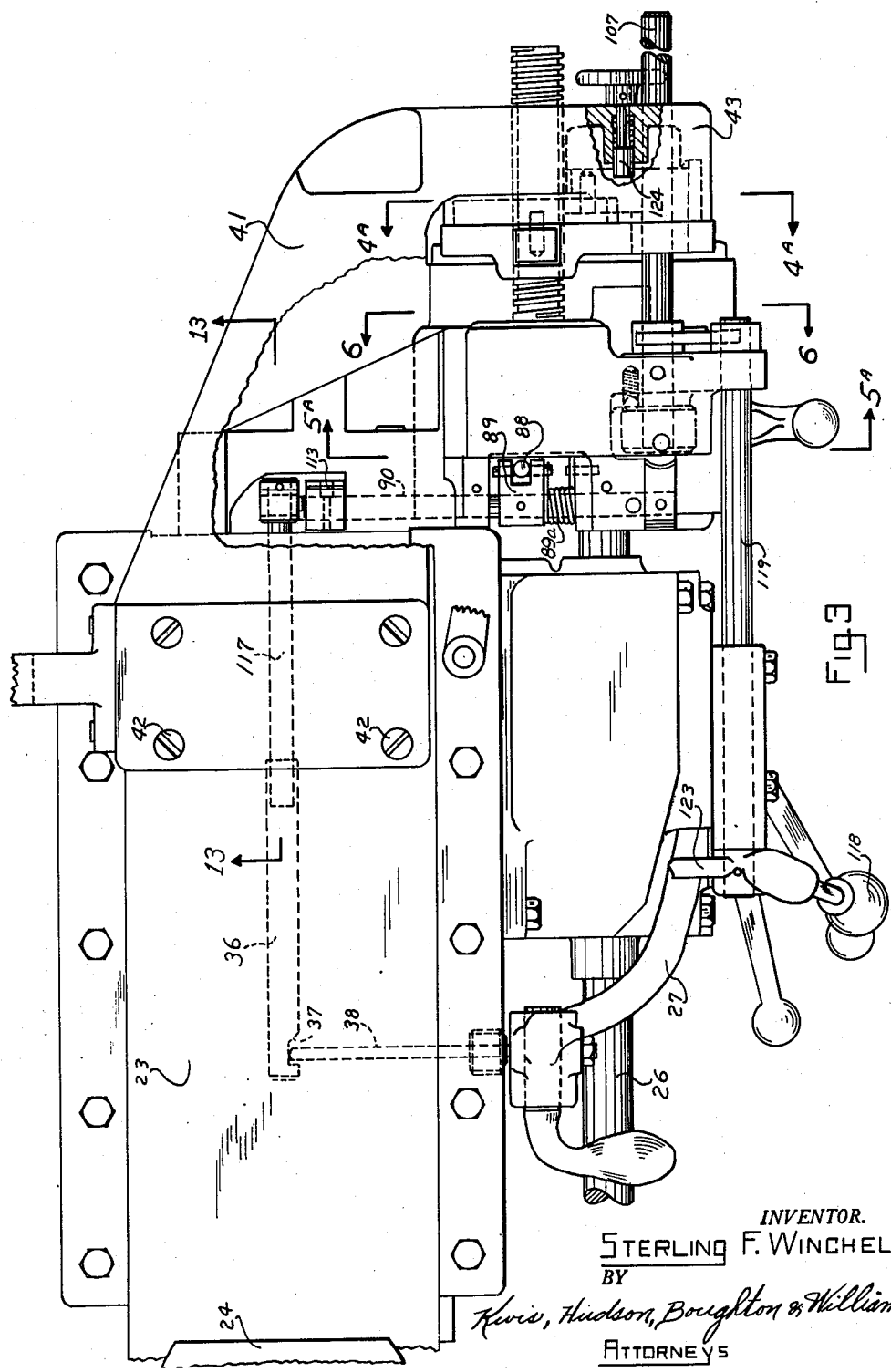

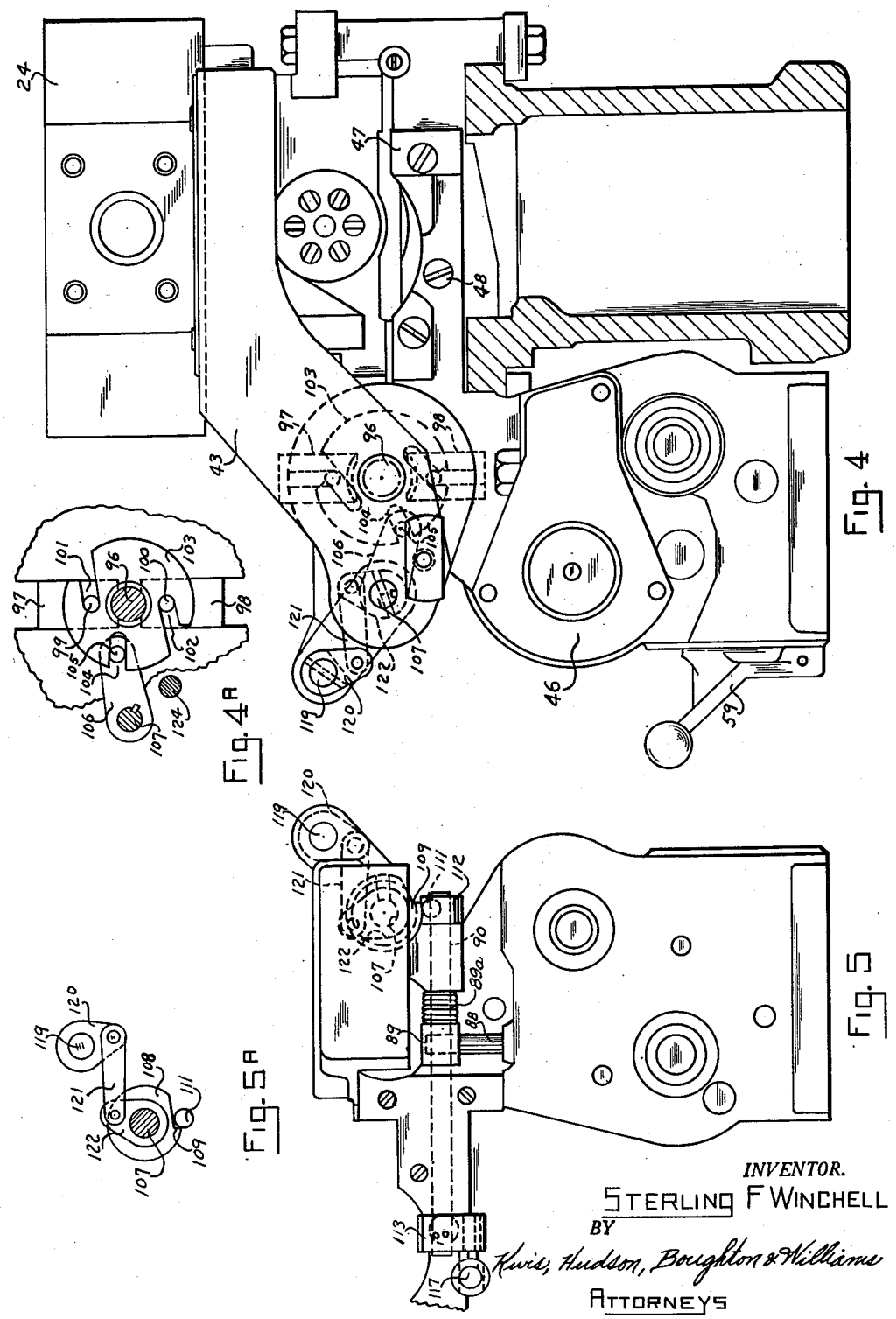

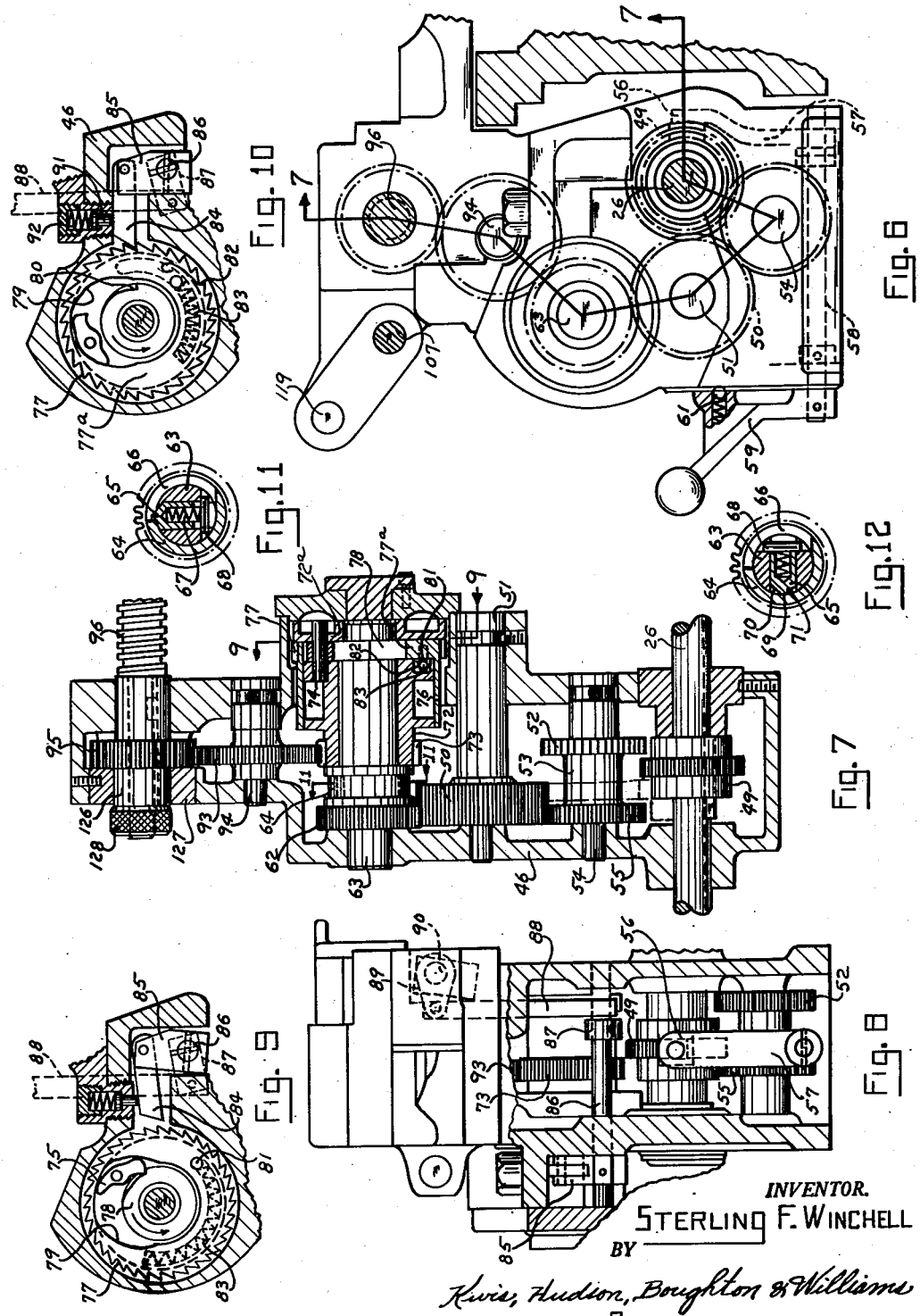

Patented Sept. 18, 1951

2,568,675

UNITED STATES PATENT OFFICE 2,568,675

MACHINE TOOL

Sterling F. Winchell, East Cleveland, Ohio, assignor to The Warner & Swasey Company, Cleveland, Ohio, a corporation of Ohio Application December 31, 1946, Serial No. 719,380

19 Claims. (Cl. 29—47)

This invention relates to a machine tool and more particularly to an improved leading-on attachment for a machine tool which will enable the latter to be employed for cutting threads or the like.

An object of the invention is to provide a machine tool, which as a work spindle adapted to rotate a workpiece in opposite directions, a feed shaft rotatable in either direction in timed relation with the work spindle and a tool supporting member movable relative to said work spindle, with an improved means for moving the tool supporting member under control of a lead screw which is rotated in only one direction by the feed shaft regardless of the direction of rotation of the latter.

Another object of the invention is to provide an improved leading-on attachment for a machine tool which will enable the tool to be used for cutting threads, the attachment comprising a lead screw with which a tool carrying member of the machine tool is selectively connectible for unidirectional movement when the screw is rotated, and driving means for effecting unidirectional rotation of the lead screw in timed relation with the rotation of the work supporting spindle of the machine tool and regardless of the direction of rotation of the latter, whereby either right-hand or left-hand threads may be cut.

A further object of the invention is to provide an improved leading-on attachment of the type described in the preceding object and in which the means provided for effecting the unidirectional rotation of the lead screw includes a gear train selectively connecting the lead screw with the feed shaft of the machine tool, the gear train including a shiftable gear selectively positionable to transform bi-directional rotation of the feed shaft into unidirectional rotation of the lead screw, and a unidirectional clutch for preventing rotation of said lead screw in a direction opposite to said unidirectional rotation in the event the shiftable gear has been incorrectly positioned.

A still further object of the invention is to provide a machine tool having a rotatable feed shaft and a movable tool carrying member adapted to be operatively connected with the feed shaft by a feed control lever for feeding movement of the member when the shaft rotates, with an improved leading-on device including a lead screw which is operatively connectible with the feed shaft for unidirectional rotation only, and means for operatively connecting the tool carrying member to the lead screw, the latter being provided with an interlock arrangement with respect to the feed control lever whereby the tool carrying member cannot be simultaneously operatively connected to the feed shaft and the lead screw.

A still further object of the invention is to provide an improved leading-on device for the turret slide of a turret lathe, the device comprising a lead screw rotated in timed relation with the rotation of the feed shaft by a gear train selectively operable by said feed shaft and provided with means for effecting unidirectional rotation of the lead screw; the device also including means for selectively connecting the lead screw with the turret slide to move the latter and means adapted to be automatically operated by the stop roll of the turret slide to disengage the operative connection between the lead screw and feed shaft when the turret slide has moved any given face of the turret to a predetermined position.

Other objects and advantages of the invention reside in various details of construction, combinations and arrangements of parts as will hereinafter become more clearly apparent to one skilled in the art from the following detailed description of a preferred embodiment of the invention described with reference to the accompanying drawings in which:

Fig. 2 is an enlarged front elevational view of a portion of the right-hand end of the turret lathe illustrated in Fig. 1, more clearly illustrating the location and nature of the improved leading-on device;

Fig. 3 is a top plan view of the structure shown in Fig. 2 with portions of the casing or frame members broken away to reveal the internal structure;

Fig. 4 is an end view, partly in section and partly in elevation, of the turret lathe shown in Fig. 1 and looking from the right of the latter, the view being on an enlarged scale and illustrating the segmental nut mechanism for operatively connecting the turret slide with the lead screw;

Fig. 4a is a fragmentary detached view, partly in section and partly in elevation, taken substantially on the line 4a—4a of Fig. 3 and illustrating the actuating mechanism for the segmental nuts in the lead screw engaging position;

Fig. 5 is a fragmentary end elevational view of the left side of the turret apron and the associated structure of the leading-on device;

Fig. 5a is a fragmentary detached view taken substantially on the line 5a—5a of Fig. 3 and illustrating certain of the parts in an operative position different from that shown in Fig. 5;

Fig. 6 is a view, partly in elevation and partly in section, of the support or housing for the gear mechanism of the leading-on device of this invention, the view being taken substantially on the line 6—6 of Fig. 3;

Fig. 7 is a developed sectional view taken substantially on the irregular section-indicating line 7—7 of Fig. 6 with certain of the gears and shafts shown in elevation;

Fig. 8 is a fragmentary view, partly in section and partly in elevation, the view being taken from the right side of the housing for the gearing mechanism shown in Fig. 6 with a portion of the housing broken away;

Fig. 9 is a sectional view taken substantially on the line 9—9 of Fig. 7 and showing a pawl clutch mechanism with the parts thereof in engaged position;

Fig. 10 is a view corresponding to Fig. 9 but showing the pawl clutch disengaged;

Fig. 11 is a sectional view through a unidirectional clutch, the view being taken substantially on the line 11—11 of Fig. 7 and showing the elements of the clutch in engagement;

Fig. 12 is a view corresponding to Fig. 11 but illustrating the elements of the unidirectional clutch in disengaged positions;

For the purpose of disclosing the nature of this invention the present preferred embodiment thereof is illustrated and described as a device for use upon a turret lathe. It will, however, be apparent that the device may be employed upon machine tools of other types and the invention is not to be considered as limited to use with a turret lathe. Moreover, while the invention is illustrated and described as preferably comprising a unitary attachment for use upon turret lathes, it will be appreciated that the device may be permanently incorporated in a machine tool at the time the latter is built rather than attached thereto at a later time.

Figure 1:
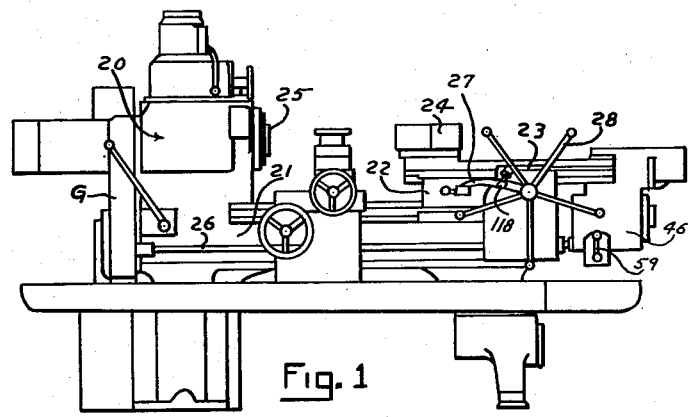
Fig. 1 is a front elevational view of a turret lathe, with certain parts omitted, and provided with a leading-on or threading device constructed in accordance with this invention.
Figure 14:
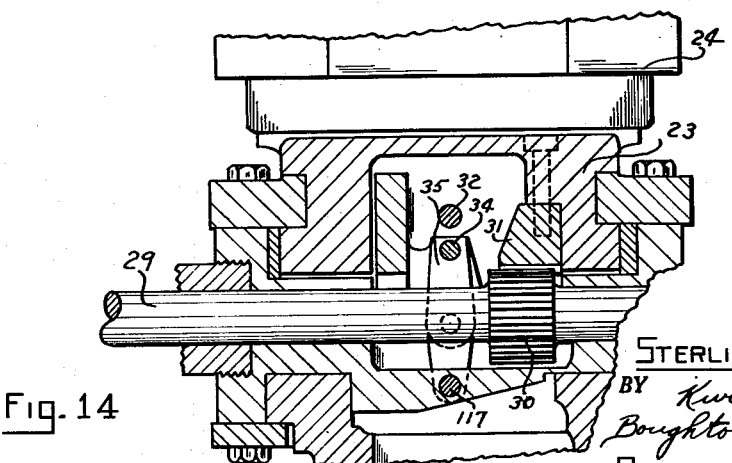
Fig. 14 is a sectional view taken substantially on the line 14—14 of Fig. 13.

In Fig. 1 of the drawings there is illustrated a turret lathe of the ram type comprising a head 20 and a bed 21 having the usual ways upon which a base or ram 22 may be adjustably positioned by conventional means. Slidably mounted upon the base or ram is a movable member or turret slide, generally designated 23, provided with an indexible turret 24, the faces of which are adapted to support various tools. The head 20 is provided with the usual work spindle and chuck 25 adapted to support a workpiece for rotation in either direction and at various speeds. Extending longitudinally of the bed 21 is a feed shaft 26 which is operatively connected with the work spindle for rotation in timed relationship thereto by conventional mechanism enclosed within the housing G. As is well understood in the art, the feed shaft is rotatable in either direction and operatively connectible with the turret slide 23 to impart a power feeding movement to the latter. The mechanism for controlling this operative connection comprises a feed controlling lever 27 (see Figs. 2 and 3) which is swingably mounted upon the apron of the turret for effecting engagement and disengagement of a clutch mechanism, not here illustrated but which is well known in the art, for example as is shown in Patent No. 1,685,310 issued September 25, 1928 to E. P. Burrell et al. As is customary, the lever 27 is held in its operated or clutch engaging position by a catch pin which enters into a recess in the turret base. The turret slide 23 may also be moved by manual operation of a turnstile or hand wheel 28 connected upon the shaft 29 (see Fig. 14) which is employed for the power feed of the turret slide, the inner end of shaft 29 being provided with a pinion 30 cooperating with a rack bar 31 fastened to the undersurface of the slide 23. It will thus be apparent that the movable member or turret slide is movable either towards or away from the head 20 by power or manual means in the conventional manner.

Figure 13:
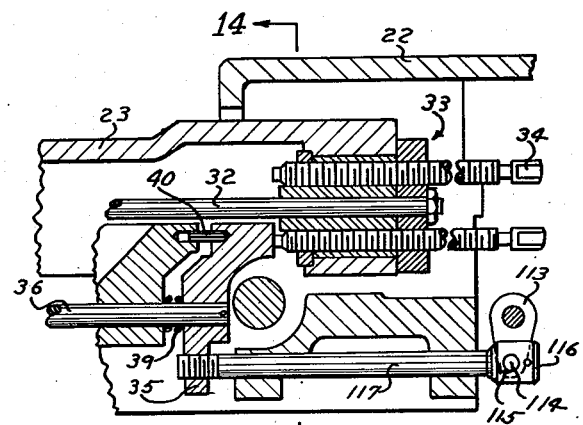
Fig. 13 is a sectional view taken substantially on the line 13—13 of Fig. 3.

The tool supporting member or turret 24 is indexibly mounted upon the turret slide 23 and is operatively connected, by means of a shaft 32 with a stop roll, generally designated 33. This stop roll is conventional and is provided with a plurality of adjustable stop screws 34, there being one such screw corresponding to each of the faces on the turret 24. The stop roll is selectively indexed by the shaft 32, when the turret is indexed, to align a screw 34 with a movable stop block 35 which is connected to one end of a knock-out rod 36 slidably supported in a portion of the base 22. The inner end of the knock-out rod 36 is provided with a cam portion 37 (see Fig. 3) which in turn cooperates with a knock-out pin 38 slidably mounted in the base 22 and adapted to project into the opening or recess for the catch pin of the feed control lever 27. A spring 39, interposed between a portion of the base 22 and the stop block 35, tends to move the latter to the right as shown in Fig. 13.

A portion of the stop block 35 is provided with a surface forming an abutment against which that one of the adjustable stop screws 34, which is indexed into alignment therewith, may engage when the turret slide or movable member 23 has moved a predetermined distance corresponding to the adjusted position of the screw. This engagement of the stop screw 34 with the stop block 35 moves the knock-out rod 36 to the left as shown in Figs. 3 and 13, thus causing the cam portion 37 of rod 36 to move the knock-out pin 38 outwardly with respect to the opening in which the catch pin of the control lever 27 is engaged, thereby displacing the said catch pin from the opening so that the feed control lever 27 will rock under the influence of gravity to disengage the power drive from the feed shaft 26 to the pinion 30.

As is well understood in the art, the turret 24 may be indexed to selectively bring the several faces thereof into operative position with respect to the work spindle 25, and when so indexed the rod or shaft 32 will rotate the stop roll 33 to align the corresponding stop screw 34 for engagement with the stop block 35. In order to prevent rocking of the stop block 35, and to keep it in proper alignment with the selectively positioned stop screws 34, a pin 40 is provided in the stop block and this pin has a sliding fit in an opening formed in the base 22.

The leading-on device of this invention is adapted to be connected with the base 22 and the turret slide 23 and to cooperate with the automatic stopping mechanism just described. As is best shown in Figs. 2, 3 and 4, this attachment comprises a frame member, generally designated 41, which is preferably attached to a boss on the rear portion of the slide 23 by fastening means 42 which may be machine screws or the like. The frame 41 has a rearwardly and forwardly projecting portion 43 which carries the mechanism for operatively engaging the lead screw of the device.

On the front of the turret lathe, adjacent the apron 45 for the turret, is mounted a gear housing or support 46, forming a part of the improved device, this housing being connected to the turret base 22 by means of a suitable bracket 47 and screws or other similar fastening means 48 (see Fig. 4) with the feed shaft 26 extending through the apron 45 and through the gear housing 46. Disposed within the housing 46, and slidably keyed or splined to the shaft 26, is a shiftable gear 49 (see Figs. 6 to 8) which is adapted, in one position, to mesh with a wide faced gear 50 mounted upon a stub shaft 51 journaled within the housing 46 as indicated by dotted lines in Fig. 6. In another position thereof, the gear 49 is adapted to mesh with the gear 52 which is one of a pair of gears formed upon a sleeve 53, rotatably journaled upon a shaft 54, the other end of the sleeve 53 being provided with a gear 55 which is in continuous mesh with a portion of the wide faced gear 50. By this construction, it will be apparent that the gear 50 may be rotated in the same direction regardless of the direction of rotation of the feed shaft 26. Thus, for one direction of rotation of the shaft 26, gear 49 thereon will directly engage gear 50; and when the shaft 26 is to be rotated in the reverse direction, the gear 49 may be shifted to engage the gear 52, thereby rotating gear 55 and hence gear 50, the latter rotating in the same direction in both instances.

Shifting of gear 49 is effected by means of a forked shoe 56 which straddles the gear 49 and is pivoted to the upper end of an operating arm 57, the lower end of which is connected to rock with a shaft 58. The forward end of shaft 58 projects through the front of the housing 46 (see Figs. 2, 4 and 6) and is provided with a handle or operating lever 59. This handle or lever is adapted to be rocked through an arc over the face of an index plate 60 and is retained in one of three positions by a spring detent 61 which may comprise a spring pressed ball cooperating with suitable recesses in plate 60 or in the face of the housing 46. The three positions for the handle or lever 59 may be indicated by suitable indicia upon the plate 60 representative of the direction of rotation of the feed shaft; for example, right hand, left hand and neutral. It will be seen that with the handle 59 positioned as shown in Fig. 2, in alignment with the neutral indication, the gear 49 is located out of mesh with respect to both the gear 52 and the gear 50 so that the latter is not rotated by rotation of feed shaft 26. By moving the lever or handle 56 to either of the other positions, corresponding with the direction of rotation of the feed shaft, the gear 49 will be correspondingly shifted to respectively engage it either directly with gear 50 or indirectly therewith through gears 52 and 55.

The gear 50 is in continuous mesh with a gear 62 which is rotatable upon a shaft 63 supported in the housing 46. The gear 62 is provided with a cylindrical sleeve extension 64 forming one portion of a unidirectional clutch, the other portion of which comprises a slidable plunger 65 mounted within a transverse bore of the shaft 63. As shown in Figs. 11 and 12, the sleeve portion 64 of the gear 62 has a circumferentially extending slot 66 into which the outer end of the plunger 65 may extend under the influence of a compression spring 67, one end of the latter being disposed within an axial bore in the plunger 65 and the other end bearing against a pin or other retaining means 68. To prevent this extension of the plunger, the outer end thereof is provided with a tooth 69 having a width substantially equal to the width of the aforementioned slot 66 and less than the diameter of the main body of the plunger. The intersection of this tooth with the main body of the plunger forms a shoulder which engages with the inner surface of the sleeve 64 to retain the plunger within the transverse bore in the shaft. The outer surface of the tooth 69 has a cam surface 70 on the one side and a notch 71 on the other side.

This construction is such that when the gear 62 is rotating in a clockwise direction, as viewed in Fig. 11, the edge of the slot 66 will engage the notched portion 71 of the tooth 69 providing a driving connection between the gear 62 and the shaft 63. In the event the gear 62 is rotated in the opposite direction, the other edge of the slot 66 will engage the cam surface 70 on the tooth 69, depressing the plunger 65 against the action of the coil spring 67 so that the gear 62 may now rotate relative to the shaft 63, as is indicated by the positions of the parts in Fig. 12. This mechanism, therefore, constitutes a unidirectional clutch so that if the operator should inadvertently fail to move the handle 59 and thus shift the gear 49 to the proper position, corresponding with the direction of rotation of the feed shaft 26, the attempted rotation of the gear 62 in the direction opposite to that of its intended rotation will automatically disengage the driving relationship of the gear with the shaft.

The shaft 63 also rotatably supports a sleeve 72 upon the outer end of which is formed a gear 73. The sleeve 72 forms the driven member of a pawl clutch (see Figs. 7, 9 and 10), the sleeve carrying one end of a pin 74 which rockably supports the pawl 75 of the clutch. The other end of pin 74 is journalled in a collar 72a which is rotatably mounted upon the shaft 63; the outer face of the collar sliding upon the adjacent interior surface of the housing 46. Rotatably supported upon circular flanges of the sleeve 72 is an outer sleeve 76 constituting the actuating member for the clutch and the latter is provided with ratchet teeth 77 on its outer periphery adjacent an end. The interior of the sleeve 76 is provided with an inwardly extending flange 77a which partially embraces an enlarged shoulder 78 upon the shaft 63, the latter constituting the driving member of the clutch. A portion of the flange 77a is cut away to provide a cam-shaped opening 79 within which the pawl 75 is positioned, the pawl 75, and flange 77a preferably being the same width as the shoulder 78. This shoulder or driving member 78 has a portion of its periphery so formed as to provide a cam-shaped recess or notched portion 80 for interengagement with the tail of the pawl 75 to provide a driving relationship between shaft 63 and gear 73 carried by the sleeve 72. Extending substantially parallel with the shaft 63 is a pin 81, one end of which is carried by the outer sleeve or actuating member 76, the inner end of the pin extending into an arcuate recess 82 provided in a flange portion of the inner sleeve or driven member 72. Disposed within this recess 82 is a coiled spring 83, one end of which engages an end of the recess 82, the other end of the spring engaging the pin 81 and tending to produce relative rotation between the sleeves 72 and 76.

The construction of this pawl clutch is such that with the parts as illustrated in Fig. 9 and with the shaft 63 rotating in the direction indicated by the arrow, the clutch is engaged so that the gear 73, carried by the driven member or sleeve 72, is rotated. The collar 72a is also rotated since one end of pin 74 is supported therein. If the ratchet teeth 77 are now held from rotation, rotation of the shaft 63 will tend to carry the pawl 75 within the cam shaped opening 79 of the actuating member or sleeve 76. At the same time the pin 81 will compress the spring 83. As the shaft 63 makes a partial revolution relative to the outer sleeve or actuating member 76, the surface of the cam opening 79 will rock the pawl 75 to the position illustrated in Fig. 10, thus disengaging the pawl from the notch or recess 80 in the driving member or collar 78 on the shaft 63 thereby disengaging the clutch. Thus, the shaft 63 may freely rotate without rotation of the sleeve 72 so that rotation of the gear 73 may be terminated while feed shaft 26 continues to rotate. The collar 72 will remain in the position to which it has been carried, thus maintaining the pawl out of engagement with respect to the notch 80, by virtue of the friction between gears 73, 93 and 95 (about to be described), and by the friction between collar 72a and the housing 46. If desired the friction between collar 72a and the housing may be increased by spring means acting therebetween which, however, is not sufficient to interfere with the rotation of the collar 72a when the clutch is engaged.

If the parts are positioned as shown in Fig. 10, with the shaft 63 rotating in the direction indicated by the arrow, the clutch may be re-engaged by releasing the ratchet teeth 77. The spring 83 will then act upon the pin 81 to produce relative rotation between sleeves 72 and 76 moving the parts to the positions indicated in Fig. 9. During the first portion of this movement the cam-shaped opening 79 will have rocked the pawl 75 into engagement with the periphery of the collar 78 on the shaft 63 so that the tail of the pawl may be moved into the notch 80 when aligned therewith.

The illustrated means for selectively engaging the ratchet teeth 77 for stopping the rotation of the latter is a toothed stop member or latch 84 mounted for movement within a recess in the housing 46. The outer end of this stop member or latch is pivotally connected to the upper end of an arm 85, the lower end of which is connected for rocking with a shaft 86. Shaft 86 is also provided with a second arm 87 connected to the shaft for rocking therewith, arms 85 and 87 forming a bell-crank lever. The other end of the arm 87 is pivotally connected to a vertically extending link 88, the upper end of which is pivotally connected to an arm 89 supported for rocking with a shaft 90. Positioned in a portion of the housing 46 so as to be vertically above the latch 84 is a plunger 91 normally urged downwardly by a spring 92. The lower end of the plunger 91 is adapted to engage the latch 84 and to position the latter as shown in Fig. 9 when the shaft 90 has been rocked to withdraw the latch member 84 from the ratchet teeth 77. When the shaft 90 is subsequently rocked in a direction to effect engagement of latch 84 with the ratchet teeth, the latter will continue to rotate a very short distance, moving the latch member into firm engagement with a portion of the housing 46, the spring 92 and plunger 91 then functioning to cushion the shock of this engagement between the latch and the housing. Rocking of the shaft 90 is controlled by the operation of the stop roll mechanism 33 and by a manually operated control lever in a manner to be hereinafter described.

As mentioned above, the sleeve or driven member 72 is provided with a gear 73. This gear meshes with an idler gear 93 journaled upon a stub shaft 94, the gear 93 in turn meshing with a gear 95. The gear 95 has a sleeve-like extension 126 which is rotatably journaled in the support or housing 46 and in a plug 127 forming a portion of the housing, the plug 127 being provided to facilitate placing the gear in the housing during assembly. The lead screw 96 has a non-threaded portion of reduced diameter extending through the sleeve 126 and slidably keyed therewith, the end of this portion of the lead screw extending exteriorly of the housing 46 and provided with a threaded portion on which is screwed a nut 128 for a purpose hereinafter described. It will be seen, therefore, that rotation of the lead screw 96 is effected by the feed shaft 26 through operation of the gear train contained in the housing or support 46 (Figs. 6, 7 and 8) and this rotation of the lead screw 96 can be effected in only one predetermined direction regardless of the direction of rotation of the feed shaft 26. As noted above, the handle 59, and hence the shiftable gear 49, is positioned to correspond with the direction of rotation of the feed shaft 26, and this will effect the rotation of the lead screw 96 in the proper direction. In the event the handle 59 and gear 49 have not been properly positioned, the unidirectional clutch will prevent rotation of the screw 96 in the reverse direction. The rotation of the screw 96 may be terminated by either placing the gear 49 in neutral position or by operation of the pawl clutch illustrated in Fig. 9 and 10 and which forms the driving connection between the shaft 63 and the gear 73.

In order to effect an operative connection between the lead screw 96 and the turret slide 23 for moving the latter by rotation of the former the forwardly projecting portion 43 of frame 41 is provided with means for engaging the screw 96 in threaded relationship. This means preferably comprises a pair of segmental nuts 97 and 98 which are mounted for movement into and out of engagement with the lead screw upon diametrically opposed sides thereof in suitably shaped guides or openings provided in the portion 43 of the frame 41. To effect this movement the segmental nut 97 is provided with a pin 99 and the segmental nut 98 is provided with a pin 100, these pins being received in angularly positioned slots 101 and 102, respectively, of a rockable disk member 103. This disk member 103 is mounted concentrically with respect to the lead screw 96 and is also provided with a radially extending slot 104, in which is disposed an actuating pin 105 carried by one end of a rockable arm 106. The other end of arm 106 is splined or slidably keyed to a rod or shaft 107 extending substantially parallel with the lead screw 96.

It will be apparent that when the shaft 107 is rocked in a counter-clockwise direction, the pin 105 will move the disk 103 in a clockwise direction so that the slots 101 and 102 will act upon the pins 99 and 100 to move the segmental nuts 97 and 98 into engagement with the thread upon the screw 96. When the segmental nuts are so positioned and the screw 96 is in rotation, the nuts and frame 41 will be moved along said screw thus moving the turret slide 23 under control of the lead screw 96. Rocking of the shaft 107 in the opposite direction will disengage the segmental nuts from the screw and discontinue this movement of the turret slide under control of the lead screw.

The rod or shaft 107 extends along the front of the machine tool and through the upper portion of the gear housing 46, the shaft being rotatably mounted therein and restrained from axial movement with respect thereto. The end of the shaft 107 within the housing or support 46 is provided with a rotatable member or collar 108, a portion of the surface of which extends through an opening in the housing 46 and is formed as a cam 109. The inner surface of the collar or member 108 and the portion of the housing 46 adjacent thereto are provided with suitable detent means 110 (see Figs. 2 and 3) for retaining the collar 108 and shaft 107 in either of two predetermined positions. Adjacent the collar 108 and riding upon the periphery of the latter for actuation by the cam 109 is a ball-pin 111 carried by the outer end of arm 112, the inner end of which is connected with the shaft 90 for rocking therewith.

The inner end of shaft 90 is provided with an arm member 113 having a pin 114 extending outwardly therefrom adjacent its outer end (see Figs. 5 and 13), this pin being received within an opening 115 provided in a collar or enlarged portion 116 attached to the outer end of a rod 117. The inner end of the rod 117 is threadably connected in the lower portion of the stop block 35, the rod 117 being guided for straight line movement under control of the stop block. As will be seen from Fig. 13, the spring 39 tends to urge the stop block 35 to the right, and is assisted by a rat trap type spring 89a (Fig. 3) surrounding a portion of the shaft 90 and having its ends connected with the arm 89 and a portion of the support or housing 46, respectively. Therefore, the arm 112 is connected through the shaft 90 and arm 113, enlarged portion 116 and shaft or rod 117 to the stop block 35 so that rocking movement of the arm 112 will correspondingly move the stop block 35. Hence, when the shaft 107 has been moved to disengage the segmenal nuts from the screw 96, the cam 109 will rock the arm 112 thereby moving the stop block very slightly to the left as shown in Fig. 13. This motion of the shaft 90 will also operate through rod 88 to position the latch 84 for disconnecting the pawl clutch and thereby stopping rotation of the lead screw 96.

Movement of the turret slide 23 may then be effected either automatically by the feed shaft 26 through the manipulation of the control lever 27 or by means of the hand wheel or turnstile 28. In the event feeding movement of the turret slide is effected by operation of feed shaft 26, the feed control lever 27 will be moved to the position indicated in Figs. 2 and 3 with the latch pin of feed control lever positioned in the recess therefor provided upon the base 22. This connects the drive train for the feeding movement to shaft 29 so that rotation of feed shaft 26 will rotate shaft 29 and pinion 30. The latter cooperates with rack 31 on slide 23 to effect a feeding movement thereof. When the turret slide has moved a predetermined distance by this driving means, contact of a stop screw 34 with the stop block 35 will operate through the knock-out rod 36 and knock-out pin 38 to release the feed control lever 27 from its latched position, the latter falling by gravity to disconnect the feed shaft from the shaft 29. This operation of the stop block will, of course, rock the shaft 90 slightly with a consequent rocking of arm 112 away from the cam surface 109 and the further removal of the latch member 84 away from the ratchet teeth 77. This additional movement has no effect upon the functioning of the device, and the parts are returned to their initial positions when the stop block 35 has returned to the position illustrated in Fig. 13 after the slide 23 has been moved to disengage the stop screw 34 therefrom.

Rocking of the shaft 107 for operation of the segmental nuts and of the collar provided with the cam 109 is effected by means of a handle or control lever 118 connected upon one end of a shaft 119 which is journaled in a suitable boss upon the apron 45 and extends through an aligned boss upon the support or gear housing 46. Upon the other end of shaft 119 is connected an arm 120, the outer end of which is pivotally connected with one end of a link 121. The other end of the link 121 is pivotally connected to an arm 122 fixed to the shaft 107. Hence, when the handle or control lever 118 is rocked, the shaft 107 is correspondingly rocked to effect movement of the segmental nuts 97, 98 and rocking of the shaft 90 for controlling operation of the pawl clutch, which in turn controls rotation of the lead screw 96.

The control handle or lever 118 is provided with an extension 123 which overhangs a portion of the feed control lever 27 so that the latter may not be operated to effect feeding movement of the turret slide by means of the feed shaft 26 when the handle or lever 118 has been positioned to effect engagement of the nuts with the lead screw and rotation of the screw through the pawl clutch. In the event an attempt is made to employ the feed control arm 27 when the control arm 118 has been operated to effect movement of the slide 23 by means of the lead screw 96, the feed control arm 27 will engage the projection 123 before the arm 27 reaches its clutch engaging position. Conversely, if the feed control lever 27 be in operative position (i. e., with its latch pin engaged within the recess of the base 22) an attempt to move the handle 118 for actuation of the turret slide by means of the lead screw mechanism will be prevented by the projection arm 123 striking the feed control arm 27 before the shaft 107 has been rocked sufficiently to either engage the segmental nuts with the lead screw or to engage the pawl clutch for operation of the latter.

The forward portion 43 of the frame 41 is provided with a pull pin 124 having a knob 125 on its outer end, the inner end of the rod extending within the frame below arm 106. As will be seen from Figs. 3 and 4, the guide openings for the segmental nuts 97 and 98 extend through the exterior of the frame member in order that the said segmental nuts may be readily placed and removed. The pin 124 being located under the arm 106 will, however, prevent the segmental nuts from being removed from their openings during the normal operation of the device, since the arm 106 will abut pin 124, thereby limiting the rocking of the disk 103 to an extent such that the pins 99 and 100 on the segmental nuts are retained within the angularly directed slots 101 and 102. However, when the pin 124 is withdrawn from the path of the arm 106, the actuating handle 118 can now be rocked sufficiently to operate through the intervening mechanism and rock the arm 106 to an extent sufficient to permit the pins 99 and 100 to be removed from the slots 101, 102. The segmental nuts may then be readily removed through the openings in the frame. The nuts are replaced by a reverse operation.

The lead screw 96 is also adapted to be easily replaced. As mentioned previously, this screw is provided with a portion of reduced diameter extending through the sleeve-like extension 126 formed integrally with the gear 95, the shaft and sleeve portion being slidably keyed together and secured against longitudinal displacement with respect to each other by means of the nut 128 on the end of the lead screw. It will be apparent that by removing the nut 128 the lead screw 96 may be pulled out and replaced by another lead screw if it be desired to employ a lead screw having a different thread.

In the operation of a machine tool equipped with a leading-on or thread cutting attachment constructed in accordance with this invention, the operator will first index the turret 24 to bring the face thereof, which carries the thread cutting tool, into operative position relative to the work spindle. He then adjusts the stop screw 34 corresponding to this turret face, to permit the desired extent of travel of the slide 23 under control of the lead screw 96. The operator next positions the handle 59 in alignment with that indicium on plate 60 corresponding to the direction of rotation of the feed shaft 26, the direction of rotation being dependent upon whether right-hand or left-hand threads are to be cut. Thus, assuming the work spindle and feed shaft are rotating in a direction which would be productive of a right-hand thread upon the work, the handle 59 will be moved to the position marked RH upon the plate 60, thereby shifting the gear 49 to the left as seen in Fig. 7 and engaging this gear directly with the wide faced gear 50 (see Figs. 6 and 8). The rotation of gear 50 will drive through gears 62, 73, 93 and 95 to rotate the lead screw 96 for cutting a right-hand thread. In the event the handle 59 had been positioned for a right-hand thread when the feed shaft 26 is rotated in a direction productive of a left-hand thread, the unidirectional clutch interposed between gear 62 and shaft 63 will prevent rotation of shaft 63 and hence of the lead screw 96.

In the event the work spindle and feed shaft are rotated in a direction for cutting a left-hand thread the handle 59 will be moved to align with the indication LH on plate 60, thus shifting gear 49 from engagement with the wide faced gear 50 and into engagement with the gear 52. The gears 52 and 55 being connected by sleeve 53 will rotate as a unit and, since gear 55 is in mesh with the gear 50, the resulting direction of rotation of gear 50 and hence of lead screw 96 will be the same as before. Here again, if the handle 59 has not been properly positioned in accordance with the direction of rotation of the feed shaft, the unidirectional clutch will prevent rotation of the lead screw 96. If it is desired to disconnect the driving connection from the feed shaft 26 to the gear train for lead screw 96, the handle 59 will be positioned in alignment with the indicium N, thus shifting the gear 49 to the position illustrated in Fig. 7 in which this gear is neither in engagement with the wide faced gear 50 nor the intermediate gear 52.

After the gear 49 has been properly positioned, the operator will then raise the arm 118 upwardly, thus rocking the shaft 119, arm 120, link 121, arm 122 and shaft 107. Rocking of shaft 107 will rock the arm 106 thereby causing the pin 105 to turn the disk 103 thus moving the segmental nuts 97 and 98 into engagement with the lead screw 96. Rocking of shaft 107 will also turn the collar 108 moving the cam 109 to the position indicated in Fig. 5a. This movement of the cam will enable the arm 112 to rock in a counter-clockwise direction (Figs. 2 and 3) under the influence of spring 89a to rock the arm 89 thus raising the rod 88 with consequent rocking of the arms 87 and 85 and withdrawal of the latch 84 from the teeth of the ratchet 77. When the latch 84 has been thus withdrawn, the spring 83 acting through the pin 82 will rock the sleeve or actuating member 76 relative to the pawl carrying member 72 from the position indicated in Fig. 10 to the position indicated in Fig. 9. The cam shaped opening 79 coacting with the pawl 75 will rock the latter into engagement with the periphery of the collar 78; and as the shaft 63 rotates, the pawl 75 will be further rocked into engagement with the notch portion 80 on the shoulder 78 as indicated in Fig. 9. This establishes the driving relationship from the feed shaft 26 through the gear train to the lead screw 96.

As lead screw 96 rotates with the segmental nuts in engagement therewith, the frame 41 and hence the turret slide 23 will be fed along the base 22 thus carrying the threading tool mounted on the turret 24 relative to the work, which is supported and rotated by the work spindle and chuck 25. When the turret and turret slide have moved the predetermined distance for which the indexed stop screw 34 has been set, the latter will abut the stop block 35 moving it against the tension of the spring 39. This will move the rod 117 to the left, as viewed in Fig. 13, causing the arm 113 to rock the shaft 90 in a clockwise direction. As a result the arm 89 will depress the link 88, thereby rocking arms 87 and 85 of the bell-crank in a counterclockwise direction, and moving the latch member 84 into the path of the rotating ratchet teeth 77. The latter will rotate through a slight arc after engagement of the latch 84 therein, moving the latter into abutting relationship with the frame 46 against the action of the spring-pressed plunger 91. The shaft 63 will, however, continue to rotate and the pawl 75 will, therefore move relative to the sleeve or actuating member 76 until the cam opening 79 has engaged the leading edge of the pawl 75 and moved it towards the center of the shaft, disengaging the tail of the pawl from the notch 80, as shown in Fig. 10. At the same time the spring 83 will have been compressed by the pin 81. This operation disconnects the drive to the lead screw 96 stopping movement of the turret slide, shaft 63 and the shoulder 78 thereon being free to continue rotation without effecting any drive of the lead screw.

The operator next depresses the handle 118, thereby rocking shaft 119 in a counter-clockwise direction, the latter operating through the arm 120, link 121 and arm 122 to rock the shaft 107 in a clockwise direction, as viewed in Fig. 4. This rocking of shaft 107 will cause arm 106 to rock until it strikes the pin 124, the rocking of arm 106 moving the disk 103 in a counter-clockwise direction thereby disengaging the segmental nuts 97 and 98 from the lead screw 96. Clockwise rocking of shaft 107 will also rock the collar 108 to position the cam portion 109 over the ball-pin 111. Hence, when the operator moves the turret slide back to its initial position, by manual operation of the hand wheel or turnstile 28, the rocking of arm 112 and shaft 90 in a counter-clockwise direction, under influence of spring 89a, is limited by engagement of the ball-pin 111 with the cam portion 109. This will cause the stop block 35 to occupy a position slightly to the left of its maximum right-hand position (Fig. 1; the distance between these two positions being equal to the movement necessary to effect disengagement of the drive for the lead screw. Although the stop block is so positioned, it is ll within the conventional range in which it can be actuated by the stop roll, during automatic feeding movement of the slide by the feed shaft 26, to automatically knock-off the slide feeding movement through the cooperation of the knockout rod 36 and pin 38 with the feed control lever 27.

This expedient prevents accidental engagement of the pawl clutch and is provided because the operations following thread cutting on a conventional turret lathe are frequently a succession of feeding operations before a threading operation is to be again employed. When the turret is to be so fed, the feed control lever is operated in the conventional manner to engage its pin in the recess provided in the base 22 thus operatively connecting the feed shaft 26 with the shaft 29 and thereby effecting feeding movement of the slide. After the slide has moved the predetermined distance, corresponding to the adjustment of the stop screw 34 associated with that face of the turret which is in operative position, this pin 34 will engage and move the stop block 35 thereby automatically knocking-off the feeding movement as previously described. However, in the event successive threading operations are to be effected, the parts of the leading-on or threading device can be properly positioned by simply operating the handle 118 as previously described. This will again engage the pawl clutch and set the stop block 35 for automatically disconnecting the pawl clutch in the gear train for the lead screw, the latter operation being permitted by movement of the cam 109 out of engagement with the ball-pin 111 on the lever 112.

As mentioned previously, the arm 118 controlling the operation of the improved threading or leading-on attachment is provided with an overhanging portion 123 forming an interlock with the feed control lever 27 so that the mechanism for effecting a threading movement cannot be placed in operation when the feed controlling lever is positioned to connect the feed shaft 26 to the mechanism for feeding movement of the turret slide. Moreover, if the leading-on attachment be positioned for operation and the feed controlling lever is then attempted to be put in operating position, the latter will strike the extension 123 upon the hande 118 before the arm 27 reaches its clutch engaging position.

The turret slide may be returned to its initial position after each operation by manual rotation of the turnstile or hand wheel 28. This manual movement of the turret slide can also be used for initial movement of the slide to bring the turret into cutting position.

It will be apparent that the improved device may be employed for cutting threads of different pitch by changing the relative speeds of the work spindle and feed shaft by means of the usual speed changing device provided in the conventional turret lathe. A further variety may be secured in the threads cut by employing different lead screws 96 and cooperating segmental nuts 97, 98, since these may be readily interchanged; the lead screw 96 being removed by simply removing the nut 128 and pulling the lead screw shaft out of the sleeve 126, and the segmental nuts being removed by withdrawing the pull pin 124 and rocking the arm 118 an additional amount to effect disengagement of the pins 99 and 100 from the angular slots 101 and 102, new shoes being placed by reverse operation. When the pull pin is returned to its initial position, it will form an abutment for the arm 106 and prevent the segmental nuts being removed from the device.

While this invention has been described with reference to employment upon a turret lathe, it will be apparent that it may be employed upon other machine tools, and that various modifications may be made in the construction and arrangement of the parts of the preferred embodiment here illustrated and described. Therefore, the invention is not to be considered as limited to the illustrated and described construction but only as required by the spirit and scope of the appended claims.

Having thus described my invention, I claim:

1. A machine tool of the type described comprising a work spindle adapted to selectively rotate a workpiece in opposite directions, a member movable relative to said work spindle and provided with means for holding a tool or tools, a feed shaft operatively connected with the work spindle for rotation in either direction in timed relation with the rotation of the work spindle, a lead screw, means operatively connecting said lead screw with said member to move the latter when the lead screw is rotated, and means for connecting said feed shaft with said lead screw for rotating the latter, the last-mentioned means including a selectively positionable member adapted to effect unidirectional rotation of said screw regardless of the direction of rotation of the feed shaft and a unidirectional rotation transmitting device interposed between said selectively positionable member and said screw for preventing rotation of the latter in the event said positionable member has been positioned to effect rotation of said lead screw in a direction opposite to said unidirectional rotation.

2. A machine tool of the type described comprising a work spindle adapted to selectively rotate a workpiece in opposite directions, a member movable relative to said work spindle and provided with means for holding a tool or tools, a feed shaft operatively connected with the work spindle for rotation in either direction in timed relation with the rotation of the work spindle, means for effecting an operative connection of said member with said feed shaft to produce a normal feeding movement of said member when said shaft is rotated, a lead screw, means for operatively connecting said lead screw with said member to effect a threading movement of the latter when said screw is rotated, means for preventing simultaneous operative connection of said member with said feed shaft and with said lead screw, and means for connecting said feed shaft with said lead screw to rotate the latter, the last-mentioned means including a selectively positionable member adapted to effect unidirectional rotation of said screw regardless of the direction of rotation of the feed shaft, and a unidirectional rotation transmitting device interposed between said selectively positionable member and said screw for preventing rotation of the latter in the event said positionable member has been positioned to effect rotation of said lead screw in a direction opposite to said unidirectional rotation.

3. A machine tool of the type described comprising a work spindle adapted to selectively rotate a workpiece in opposite directions, a member movable relative to said work spindle and provided with means for holding a tool or tools, a feed shaft operatively connected with the work spindle for rotation in either direction in timed relation with the rotation of the work spindle; a lead screw, means operatively connecting said lead screw with said member to move the latter when said screw is rotated, and means for connecting said feed shaft with said lead screw to rotate the latter, the last-mentioned means including a selectively positionable member adapted to effect unidirectional rotation of said screw regardless of the direction of rotation of the feed shaft, a unidirectional rotation transmitting device interposed between said selectively positionable member and said screw for preventing rotation of the latter in the event said positionable means has been positioned to effect rotation of said lead screw in a direction opposite to said unidirectional rotation, and means responsive to a predetermined distance of movement of said movable member to automatically terminate rotation of said screw by said shaft.

4. A machine tool of the type described in claim 3 and in which the said means to automatically terminate rotation of the lead screw by the feed shaft comprises a clutch forming a part of the driving connection between said screw and shaft; said clutch including a driving member, a driven member, a pawl adapted to interconnect said driving and driven members, an actuating member, resilient means connecting said driven member to said actuating member for normal rotation of said driven and actuating members in unison and to permit relative rotation therebetween, and means on said actuating member for moving said pawl to connect the said driving and driven members when said actuating member is rotated relative to said driven member in one direction and for moving said pawl to disconnect said driven member from said driving member when said actuating member is rotated relative to said driven member in the opposite direction; and means automatically actuated by movement of said movable member a predetermined distance to selectively control said relative rotation between the actuating member and the driven member.

5. A machine tool of the type described comprising a work spindle and a feed shaft operatively connected for rotation in either direction; a tool carrying member movable relative to said work spindle; means for operatively connecting said member with said feed shaft for producing a normal feeding movement of said member when said shaft is rotated; a lead screw; means for operatively connecting said lead screw with said member to effect a threading movement of the latter when said screw is rotated; means for preventing simultaneous operative connection of said member with said feed shaft and with said lead screw; and means for connecting said feed shaft with said lead screw for rotating the latter including a selectively positionable member adapted to effect unidirectional rotation of said screw regardless of the direction of rotation of the feed shaft and a unidirectional rotation transmitting device interposed between said selectively positionable member and said screw for preventing rotation of the latter in the event said positionable member has been positioned to effect rotation of said lead screw in a direction opposite to said unidirectional rotation; and a single means actuated by said movable member when the latter has moved a predetermined distance to automatically disconnect the lead screw from said feed shaft or said operative connections for effecting feeding movement of said movable member.

6. A machine tool of the type described comprising a work spindle adapted to selectively rotate a workpiece in opposite directions, a member movable relative to said work spindle and provided with means for holding a tool or tools, a feed shaft operatively connected with the work spindle for rotation in either direction in timed relation with the rotation of the work spindle, a lead screw, nut means carried by said member and selectively engageable with said lead screw for operatively connecting said lead screw with said member to move the latter when said screw is rotated, and a gear train for connecting said feed shaft with said lead screw to rotate the latter, said gear train including a shiftable gear selectively positionable for cooperation with either of two different gears in said train to effect unidirectional rotation of said screw regardless of the direction of rotation of the feed shaft, and a unidirectional clutch interposed between said shiftable gear and said screw for preventing rotation of the latter in the event said shiftable gear has been positioned to effect rotation of said lead screw in a direction opposite to said unidirectional rotation.

7. A machine tool of the type described comprising a work spindle adapted to selectively rotate a workpiece in opposite directions, a member movable relative to said work spindle and provided with means for holding a tool or tools, a feed shaft operatively connected with the work spindle for rotation in either direction in timed relation with the rotation of the work spindle, means for operatively connecting said member with said feed shaft for producing a normal feeding movement of said member when said shaft is rotated, a lead screw, nut means carried by said member and selectively engageable with said screw to effect a threading movement of the member when said screw is rotated, means for preventing simultaneous operative connection of said member with said feed shaft and with said lead screw, and a gear train for connecting said feed shaft with said lead screw to rotate the latter, said gear train including a shiftable gear selectively positionable for cooperation with either of two other gears in said train to effect unidirectional rotation of said screw regardless of the direction of rotation of the feed shaft, and a unidirectional clutch interposed between said shiftable gear and said screw for preventing rotation of the latter in the event said shiftable gear has been positioned to effect rotation of said lead screw in a direction opposite to said unidirectional rotation.

8. A machine tool of the type described comprising a work spindle adapted to selectively rotate a workpiece in opposite directions; a member movable relative to said work spindle and provided with means for holding a tool or tools; a feed shaft operatively connected with the work spindle for rotation in either direction in timed relation with the rotation of the work spindle; a lead screw; nut means carried by said member and selectively engageable with said lead screw to effect movement of the latter when said screw is rotated; a gear train for connecting said feed shaft with said lead screw to rotate the latter including a shiftable gear selectively positionable for cooperation with either two different gears in said train to effect unidirectional rotation of said screw regardless of the direction of rotation of the feed shaft, a unidirectional clutch interposed between said shiftable gear and said screw for preventing rotation of said screw in the event said shiftable gear has been positioned to effect rotation of said lead screw in a direction opposite to said unidirectional rotation, and a second clutch controlled by means externally of said gear train; and means automatically operated by said movable member when the latter has moved a predetermined distance to disengage said second clutch thereby terminating the rotation of said screw by said shaft.

9. A machine tool of the type described in claim 8 and in which said means automatically operated by the movable member when the latter has moved a predetermined distance comprise interconnected shiftable elements supported upon a relatively stationary part of the machine tool with one of said elements cooperating with said second clutch to control the engagement and disengagement thereof, and a member adjustably mounted upon said movable member and adapted to contact another of said shiftable elements and effect shifting of said elements when said movable member has moved the distance determined by the adjustment of said adjustable member.

10. A machine tool of the type described comprising a work spindle adapted to selectively rotate a workpiece in opposite directions, a turret slide movable relative to said work spindle and provided with an indexible turret for holding tools upon the several faces thereof, a feed shaft operatively connected with the work spindle for rotation in either direction in timed relation with the rotation of the work spindle, a lead screw, means connected with the turret slide and selectively engageable with said lead screw to effect movement of the latter when said screw is rotated, a gear train for connecting said feed shaft with said lead screw to rotate the latter, said gear train including a shiftable gear selectively positionable for cooperation with either of two other gears in said train to effect unidirectional rotation of said screw regardless of the direction of rotation of rotation of the feed shaft, a unidirectional clutch interposed between said shiftable gear and said screw for preventing rotation of the latter in the event said shiftable gear has been positioned to effect rotation of said lead screw in a direction opposite to said unidirectional rotation, a second clutch interposed in said gear train, a stop roll having a plurality of adjustable stop members thereon each corresponding to a face of said turret and indexible in fixed relation with the indexing of the turret, means supporting said stop roll for movement with said turret slide, and means to automatically disengage said second clutch and terminate the rotation of said screw by said shaft when the turret slide has moved a distance corresponding to the adjustment of said indexed stop member, the last-mentioned means comprising a member adapted to be engaged and moved by said indexed stop member and operative connections between said last-mentioned member and said second clutch to disengage the latter when said last-mentioned member is moved by said stop member.

11. A machine tool of the type described comprising a work spindle adapted to selectively rotate a workpiece in opposite directions; a member movable relative to said work spindle and provided with means for holding a tool or tools; a feed shaft operatively connected with the work spindle for rotation in either direction in timed relation with the rotation of the work spindle; means for operatively connecting said member with said feed shaft for producing a normal feeding movement of said member when said shaft is rotated; a lead screw; nut means carried by said member and selectively engageable with said lead screw to effect a threading movement of the member when said screw is rotated; means for preventing simultaneous operative connection of said member with said feed shaft and with said lead screw; a gear train for connecting said feed shaft with said lead screw for rotating the latter including a shiftable gear selectively positionable for cooperation with either of two other gears in said train to effect unidirectional rotation of said screw regardless of the direction of the rotation of the feed shaft and a unidirectional clutch interposed between said shiftable gear and said screw for preventing rotation of the latter in the event said shiftable gear has been positioned to effect rotation of said lead screw in a direction opposite to said unidirectional rotation; and a single means actuated by said movable member when the latter has moved a predetermined distance to automatically disconnect the feed shaft from said lead screw or said operative connections for effecting feeding movement of said movable member.

12. A threading attachment for use with a machine tool having a work spindle adapted to selectively rotate work in opposite directions, a feed shaft operatively connected with the work spindle for rotation in either direction in timed relation with the work spindle, and a slide provided with means for holding a tool or tools; the attachment comprising a frame member detachably connectible with said slide, a lead screw, a support detachably connectible with a relatively stationary part of said machine tool for rotatably supporting said lead screw, means carried by said frame member and selectively engageable with said lead screw for effecting movement of said frame member and slide when said screw is rotated, and means for connecting said feed shaft with said lead screw for rotating the latter, the last-mentioned means including a selectively positionable member carried by said support and adapted to effect unidirectional rotation of said screw regardless of the direction of rotation of the feed shaft, and a unidirectional rotation transmitting device interposed between said selectively positionable member and said screw for preventing rotation of the latter in the event said positionable member has been positioned to effect rotation of said lead screw in a direction opposite to said unidirectional rotation.

13. A threading attachment for use with a machine tool having a work spindle adapted to selectively rotate work in opposite directions, a feed shaft operatively connected to said work spindle for rotation in either direction in timed relation with the work spindle, and a slide provided with means for holding a tool or tools; the attachment comprising a frame member detachably connectible with said slide, a lead screw, a support detachably connectible with a relatively stationary part of said machine tool for rotatably supporting said lead screw, means carried by said frame member and selectively engageable with said lead screw for effecting movement of said frame member and slide when said screw is rotated, and means for operatively connecting said feed shaft with said lead screw for rotating the latter, the last-mentioned means including a selectively positionable member carried by said support and adapted to effect unidirectional rotation of said screw regardless of the direction of rotation of the feed shaft, a unidirectional rotation transmitting device interposed between said selectively positionable member and said screw for preventing rotation of the latter in the event said positionable member has been positioned to effect rotation of said lead screw in a direction opposite to said unidirectional rotation, and means actuated by said slide after the latter has moved a predetermined distance to automatically terminate rotation of said screw.

14. A threading attachment of the type defined in claim 13 and in which said means for automatically terminating rotation of said lead screw by said feed shaft includes a pawl clutch comprising two rotatable members adapted to rotate together or relative to each other, a pawl pivotally mounted on one of said rotatable members, means on the other of said rotatable members adapted to engage said pawl to rock the latter in one direction for effecting clutch engagement and in the other direction for effecting clutch disengagement, and means cooperating with said members to cause relative rotation therebetween for effecting rocking of said pawl.

15. A threading attachment of the type described in claim 13 and in which the said means to automatically terminate rotation of the lead screw by the feed shaft comprises a clutch forming a part of the driving connection between said screw and shaft; said clutch including a driving member, a driven member, an actuating member, resilient means connecting said driven member to said actuating member for normal rotation of said driven and actuating members in unison and permit relative rotation therebetween, and means on said actuating member for moving said pawl to connect the latter with said driving member when said actuating member is rotated relative to said driven member in one direction and for disconnecting said pawl from said driving member when said actuating member is rotated relative to said driven member in the opposite direction; and means automatically actuated by movement of said movable member and cooperating with said clutch to selectively control said relative rotation between the actuating member and the driven member.

16. A threading attachment for use with a machine tool having a work spindle adapted to selectively rotate work in opposite directions, a feed shaft operatively connected to said work spindle for rotation in either direction in timed relation with the work spindle, a slide provided with means for holding a tool or tools, means to operatively connect the feed shaft to the slide for producing a feeding movement of the latter and stop means actuated by the slide when the latter has moved a predetermined distance to automatically disconnect the operative connection and terminate the feeding movement; the attachment comprising a frame member detachably connectible with said slide, a lead screw, a support detachably connectible with a relatively stationary part of said machine tool for rotatably supporting said lead screw, means carried by said frame member and selectively engageable with said lead screw for effecting movement of said frame member and slide when said screw is rotated, means for preventing simultaneous engagement of said selectively engageable means with the lead screw and the operative connection of the feed shaft with the tool slide, means for connecting said feed shaft with said lead screw for rotating the latter, the last-mentioned means including a selectively positionable member carried by said support and adapted to effect unidirectional rotation of said screw regardless of the direction of rotation of the feed shaft, a unidirectional rotation transmitting device interposed between said selectively positionable member and said screw for preventing rotation of the latter in the event said positionable member has been positioned to effect rotation of said lead screw in a direction opposite to said unidirectional rotation, and means cooperating with the means for connecting the said shaft with the lead screw and actuated by the stop means of the machine tool when the slide has moved a predetermined distance to automatically terminate rotation of said screw by said shaft.

17. A threading attachment for use with a machine tool having a work spindle adapted to selectively rotate work in opposite directions, a feed shaft operatively connected to said work spindle for rotation in either direction in timed relation with the work spindle, and a movable slide provided with means for holding a tool or tools; the attachment comprising a frame member detachably connectible with said slide, a lead screw, nut means carried by said frame member and selectively engageable with said lead screw to effect movement of said frame member and slide when said screw is rotated, a housing detachably connected with a relatively stationary part of said machine tool and adapted to rotatably support said lead screw, and a gear train in said housing and adapted to operatively connect said feed shaft to said lead screw for rotating the latter, said gear train including a shiftable gear selectively positionable for cooperation with either of two different gears of said train to effect unidirectional rotation of said lead screw regardless of the direction of rotation of said feed shaft, and a unidirectional clutch interposed between said shiftable gear and said screw for preventing rotation of the latter in a reverse direction in the event said shiftable gear has been positioned to effect rotation of said lead screw in a direction opposite to said unidirectional rotation.

18. A threading attachment for use with a machine tool which has a movable tool slide and a feed shaft rotatable in opposite directions, said attachment comprising a frame member detachably connectible with said slide, a housing member adapted to be connected to a relatively stationary portion of the machine tool, a lead screw rotatably journaled in said housing, nut means carried by said frame member and selectively engageable with said lead screw to effect movement of said frame member and slide when said screw is rotated, a gear train in said housing adapted to operatively connect said feed shaft to said lead screw for rotating the latter, said gear train including a shiftable gear selectively positionable for cooperation with either of two different gears of said train to effect unidirectional rotation of said lead screw regardless of the direction of rotation of said feed shaft, a unidirectional clutch interposed between said shiftable gear and said screw for preventing rotation of the latter in a reverse direction in the event said shiftable gear has been positioned to effect rotation of said lead screw in a direction opposite to said unidirectional rotation, a second clutch in said gear train adapted to be controlled by means externally of said gear train, and means cooperating with said second clutch and engaged by said slide when the latter has moved a predetermined distance to effect disengagement of said second clutch thereby terminating the rotation of the lead screw by the feed shaft.

19. A threading attachment for use with a machine tool which has a movable tool slide and a feed shaft rotatable in opposite directions, said attachment comprising a frame member detachably connectible with said tool slide, a housing member adapted to be connected to a relatively stationary portion of the machine tool, a lead screw rotatably journaled in said housing, nut means carried by said frame member and selectively engageable with said lead screw to effect movement of said frame member and slide when said screw is rotated, a gear train in said housing including gears operatively connected to said feed shaft and to said lead screw respectively, a unidirectional clutch in said gear train permitting only unidirectional rotation of said lead screw regardless of the direction of rotation of said feed shaft, a second clutch in said gear train including two relatively rotatable members rotatably mounted upon a shaft of said gear train, a pawl pivoted upon one of said members and adapted to provide a driving relationship between said one member and shaft, a camming surface on the other of said rotatable members adapted to move said pawl into and out of driving engagement with said shaft, resilient means extending between said rotatable members tending to rock the said members in a direction to effect driving engagement of the pawl with said shaft, means cooperating with the said other of the rotatable members and actuated by said slide when the latter has moved a predetermined distance to restrain rotation of said other of the rotatable members and thereby disengage said pawl from said shaft.

STERLING F. WINCHELL.

REFERENCES CITED

The following references are of record in the file of this patent:

UNITED STATES PATENTS

| Number | Name | Date |
| --- | --- | --- |
| 736,792 | Search | Aug. 18, 1903 |
| 2,100,899 | Burger et al. | Nov. 30, 1937 |
| 2,154,546 | Van Hamersveld | Apr. 18, 1939 |
| 2,286,715 | Cheever | June 16, 1942 |